US012505809B2

(12) United States Patent
Lo et al.

(10) Patent No.: US 12,505,809 B2
(45) Date of Patent: Dec. 23, 2025

(54) DRIVER CIRCUIT

(71) Applicant: Novatek Microelectronics Corp., Hsinchu (TW)

(72) Inventors: Hsien-Wen Lo, Hsinchu County (TW); I-Min Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/950,136

(22) Filed: Nov. 17, 2024

(65) Prior Publication Data

US 2025/0201201 A1 Jun. 19, 2025

Related U.S. Application Data

(63) Continuation-in-part of application No. 18/540,889, filed on Dec. 15, 2023.

(60) Provisional application No. 63/673,800, filed on Jul. 22, 2024.

(51) Int. Cl.
*G09G 3/3275* (2016.01)

(52) U.S. Cl.
CPC ... *G09G 3/3275* (2013.01); *G09G 2300/0809* (2013.01)

(58) Field of Classification Search
CPC ..................... G09G 3/3275; G09G 2300/0809
USPC .......................................................... 345/204
See application file for complete search history.

(56) References Cited

U.S. PATENT DOCUMENTS

2003/0090451 A1* 5/2003 Ahn ..................... G09G 3/3688 345/96
2016/0322008 A1 11/2016 Sang et al.
2019/0156754 A1 5/2019 Cheng et al.
2020/0020296 A1 1/2020 Kim et al.
2020/0118475 A1 4/2020 Jang et al.
2023/0024029 A1 1/2023 Yu et al.

FOREIGN PATENT DOCUMENTS

CN 107342062 A 11/2017
CN 107833560 3/2018
CN 115527498 12/2022
CN 115527498 A * 12/2022 ........... G09G 3/3275

(Continued)

OTHER PUBLICATIONS

"Office Action of Taiwan Related Application, Application No. 113116440", issued on Mar. 5, 2025, p. 1-p. 13.

(Continued)

*Primary Examiner* — Mark Edwards
(74) *Attorney, Agent, or Firm* — JCIPRNET

(57) ABSTRACT

A driver circuit including a switch circuit and a source driver circuit is provided. The switch circuit is configured to receive an input display data and output an output display data according to two control signals. The input display data and the output display data have different data arrangement. The source driver circuit is coupled to the switch circuit. The source driver circuit is configured to output the output display data to drive a display panel via the switch circuit. An applying sequence of the two control signals is adjusted according to at least one adjustment signal, and the two control signals are applied to switch sets of the switch circuit according to the applying sequence.

10 Claims, 10 Drawing Sheets

(56) References Cited

FOREIGN PATENT DOCUMENTS

| | | | |
|---|---|---|---|
| CN | 116863851 | | 10/2023 |
| TW | 202101417 | A | 1/2021 |

OTHER PUBLICATIONS

"Office Action of Taiwan counterpart Application", issued on Nov. 6, 2025, p. 1-p. 4.

* cited by examiner

DRIVER CIRCUIT

CROSS-REFERENCE TO RELATED APPLICATION

This application is a continuation-in-part application of and claims the priority benefit of a prior application Ser. No. 18/540,889, filed on Dec. 15, 2023. This application also claims the priority benefit of U.S. provisional application Ser. No. 63/673,800, filed on Jul. 22, 2024. The entirety of the above-mentioned patent applications is hereby incorporated by reference herein and made a part of this specification.

BACKGROUND

Technical Field

The invention relates to a driver circuit, more specifically, to a driver circuit configured to drive a display panel.

Description of Related Art

An electronic device with a display function typically includes a display panel and a driver chip. The driver chip is configured to drive the display panel to display an image. The driver chip is connected to the display panel through a fan-out area to output display data to drive the display panel. In order to reduce the length of the fan-out area between the driver chip and the display panel, extended connecting lines of the display panel may be laid out in the active area of the display panel. However, for the driver chip to drive a display panel with this layout, the sequence of the data outputted to the display panel must be changed so that the display data could properly drive the pixels on the display panel.

SUMMARY

The invention is directed to a driver circuit, capable of rearranging display data to adaptively drive the display panel. In addition, the length of the fan-out area can be reduced.

An embodiment of the invention provides a driver circuit including a switch circuit and a source driver circuit. The switch circuit is configured to receive an input display data and output an output display data according to two control signals. The input display data and the output display data have different data arrangement. The source driver circuit is coupled to the switch circuit. The source driver circuit is configured to output the output display data to drive a display panel via the switch circuit. An applying sequence of the two control signals is adjusted according to at least one adjustment signal, and the two control signals are applied to switch sets of the switch circuit according to the applying sequence.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
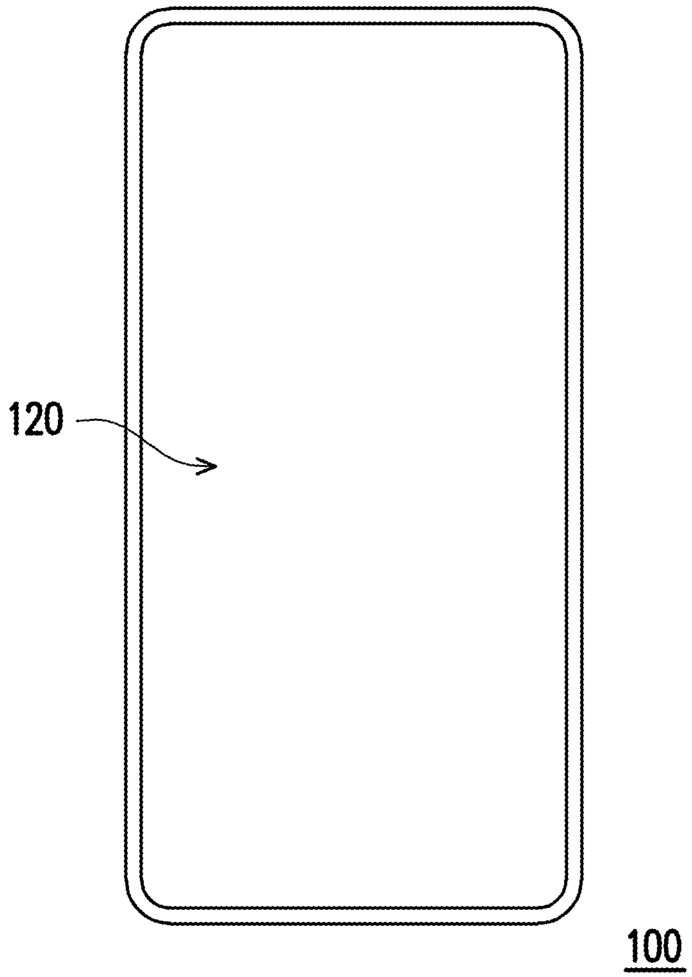
FIG. 1 is a schematic diagram illustrating an electronic device according to an embodiment of the invention.
Figure 2:
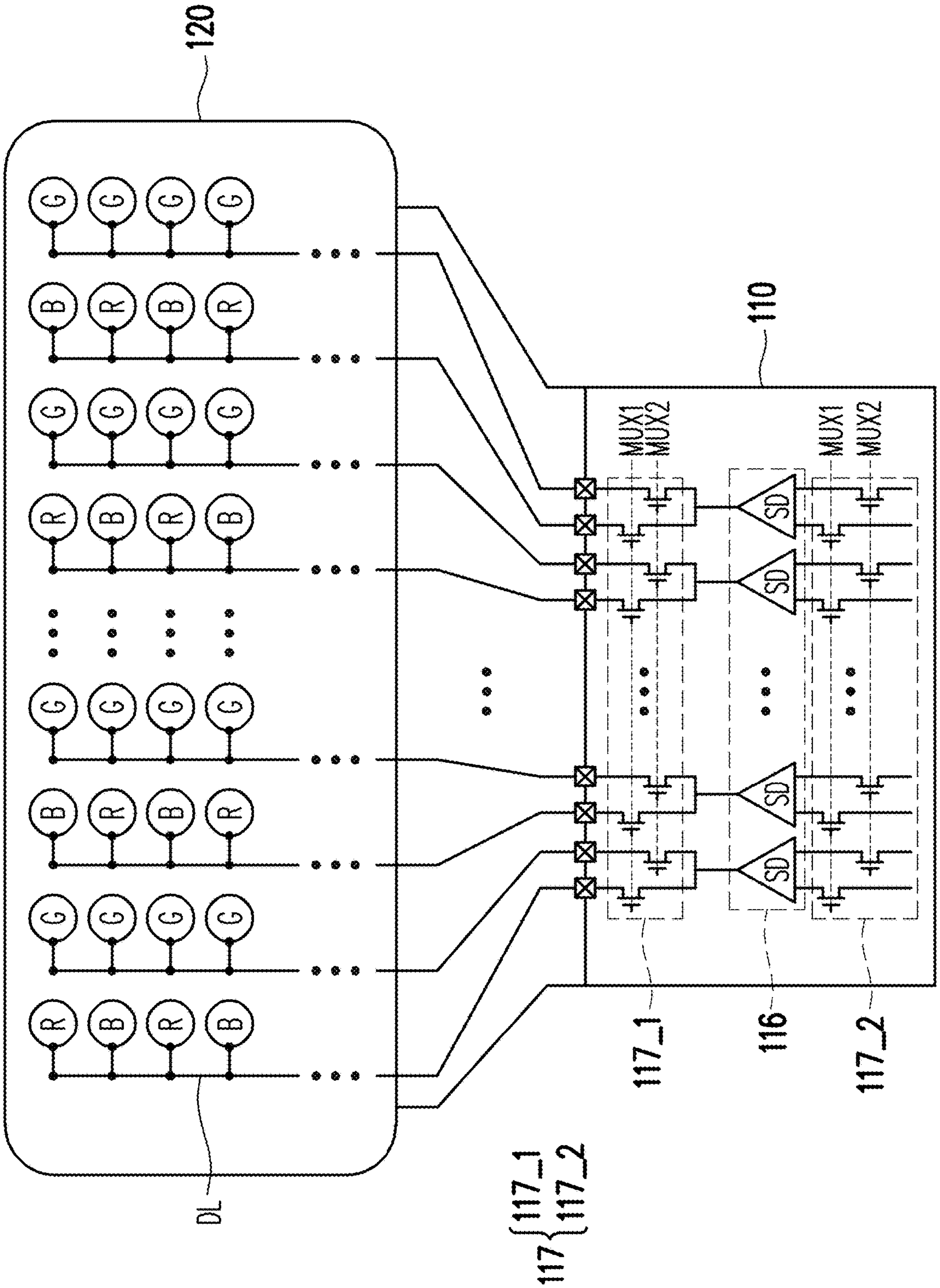
FIG. 2 is a circuit diagram illustrating the electronic device of FIG. 1 according to an embodiment of the invention.

FIG. 1 is a schematic diagram illustrating an electronic device according to an embodiment of the invention. FIG. 2 is a circuit diagram illustrating the electronic device of FIG. 1 according to an embodiment of the invention. Referring to FIG. 1 and FIG. 2, the electronic device 100 includes a driver circuit 110 and a display panel 120. The driver circuit 110 is configurable to be coupled to the display panel 120. The display panel 120 may be a self-illuminated display panel, e.g. an organic light-emitting diode (OLED) panel, but the invention is not limited thereto.

The driver circuit 110 is configured to drive the display panel 120 to display images. The driver circuit 110 includes a source driver circuit 116 and a switch circuit 117. The source driver circuit 116 is configured to output driving signals to drive the display panel 120 to display images. The switch circuit 117 includes a first switch unit 117_1 and a second switch unit 117_2. The first switch unit 117_1 and the second switch unit 117_2 are respectively disposed at the output end and the input end of the source driver circuit 116. The first switch unit 117_1 and the second switch unit 117_2 are controlled by control signals MUX1 and MUX2 to rearrange received display data to corresponding data lines DL.

In an embodiment, the switches of the first switch unit 117_1 and the second switch unit 117_2 may be implemented as metal oxide semiconductor field effect transistors (MOSFET). The MOSFETs on the driver circuit 110, e.g. display driver integrated circuit (DDIC), have characteristics of lower operating voltages, lower on-resistances, and lower power consumption.

The driver circuit 110 may include a controller circuit (not shown) to generate the control signals MUX1 and MUX2. The controller circuit may be a processor having computational capability. Alternatively, the controller circuit may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the controller circuit can be obtained with reference to common knowledge in the related art. In another embodiment, the controller circuit may be disposed in an application processor of the electronic device 100.

In the present embodiment, the electronic device 100 may be an electronic device having a display function, a touch sensing function and/or a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and/or the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 3:
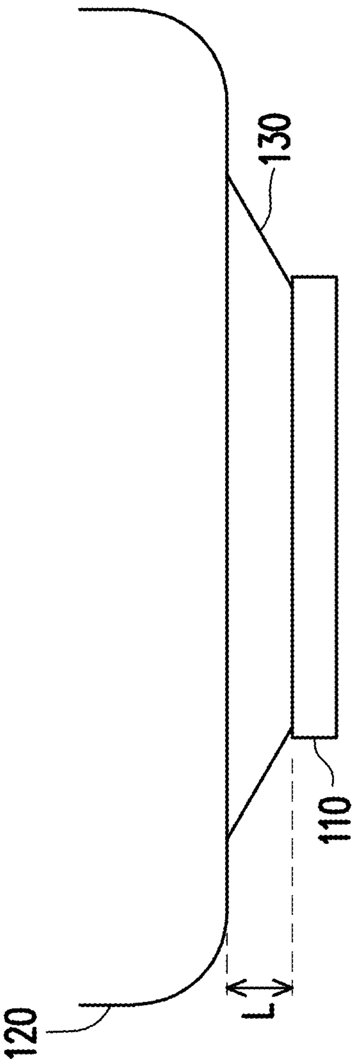
FIG. 3 is a schematic diagram illustrating a fan-out area between the driver circuit and the display panel of FIG. 2 according to an embodiment of the invention.

FIG. 3 is a schematic diagram illustrating a fan-out area between the driver circuit and the display panel of FIG. 2 according to an embodiment of the invention. Referring to FIG. 3, in the present embodiment, the driver circuit 110 is connected to the display panel 120 through the fan-out area 130, but the invention is not limited thereto. In an embodiment, an electrostatic discharge (ESD) protection circuit and a bending area may be disposed between the driver circuit 110 and the display panel 120.

In the present embodiment, since the first switch unit 117_1 and the second switch unit 117_2 for data rearrangement are both disposed in the driver circuit 110, the length L of the fan-out area 130 can be reduced. In addition, in order to further reduce the length L of the fan-out area 130, a layout of data lines DL of the display panel 120 may be implemented in a manner of fan-out in active area (FIAA). In the present embodiment, FIAA layout is adopted for data lines DL, and thus the length L of the fan-out area 130 of FIG. 3 is small relative to a display panel without FIAA layout.

Figure 4:
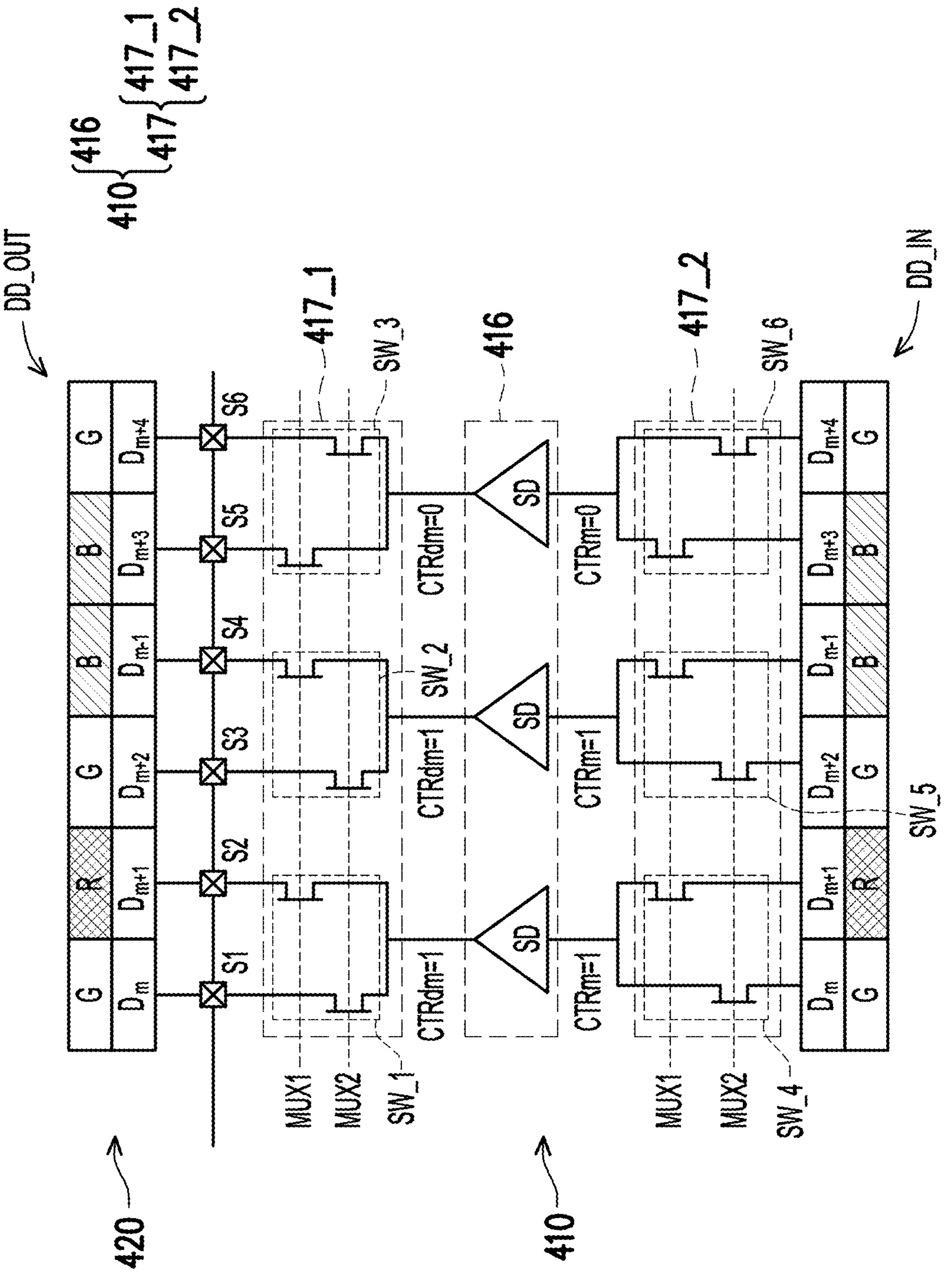
FIG. 4 is a schematic diagram illustrating a driver circuit and a display panel according to an embodiment of the invention.

FIG. 4 is a schematic diagram illustrating a driver circuit and a display panel according to an embodiment of the invention. Referring to FIG. 4, the driver circuit 410 is configured to drive the display panel 420 with FIAA layout. The driver circuit 410 includes a switch circuit 417 and a source driver circuit 416. The source driver circuit 416 is coupled to the switch circuit 417. The source driver circuit 416 is configured to output the output display data DD_OUT to drive a display panel 420 via the switch circuit 417.

The switch circuit 417 is configured to receiving an input display data DD_IN and output an output display data DD_OUT according to two control signals MUX1 and MUX2. The input display data DD_IN and the output display data DD_OUT have different data arrangement. An applying sequence of the two control signals MUX1 and MUX2 is adjusted according to at least one adjustment signal CTRm and/or CTRdm. The two control signals MUX1 and MUX2 are applied to switch sets SW_1 to SW_6 of the switch circuit 417 according to the applying sequence.

To be specific, the switch circuit 417 includes a first switch unit 417_1 and a second switch unit 417_2. The second switch unit 417_2 is disposed at an input end of the source driver circuit 416. The second switch unit 417_2 is configured to receive the input display data DD_IN, and output the input display data DD_IN according to the two control signals MUX1 and MUX2. The first switch unit is disposed at an output end of the source driver circuit 416. The first switch unit is configured to receive the input display data DD_IN from the source driver circuit 416, and output the output display data DD_OUT according to the two control signals MUX1 and MUX2. The output display data DD_OUT will be written into corresponding pixels.

The first switch unit 417_1 includes a plurality of first switch sets SW_1, SW_2, and SW_3. Each of the first switch sets SW_1, SW_2, and SW_3 is controlled by the two control signals MUX1 and MUX2. Compared to the second switch set SW_3, the applying sequence of the control signals MUX1 and MUX2 are adjusted, and the control signals MUX1 and MUX2 are applied to the first switch sets SW_1 and SW_2 according to the adjusted applying sequence. The applying sequence of the control signals MUX1 and MUX2, which are applied to the first switch set SW_3, remains unchanged.

On the other hand, the second switch unit 417_2 includes a plurality of second switch sets SW_4, SW_5, and SW_6. Each of the second switch sets SW_4, SW_5, and SW_6 also is controlled by the two control signals MUX1 and MUX2. Corresponding to the first switch unit 417_1, in the second switch unit 417_2, the applying sequence of the control signals MUX1 and MUX2 are also adjusted, and the control signals MUX1 and MUX2 are applied to the second switch sets SW_4 and SW_5 according to the adjusted applying sequence. The applying sequence of the control signals MUX1 and MUX2, which are applied to the second switch set SW_6, remains unchanged.

In the present embodiment, the applying sequence of the control signals MUX1 and MUX2 applied to the first switch set SW_3 and the second switch set SW_6 can be deemed as a first applying sequence (a preset applying sequence). The applying sequence of the control signals MUX1 and MUX2 applied to the first switch set SW_1 and SW_2 and the second switch set SW_4 and SW_5 can be deemed as a second applying sequence. CTRm=1 and CTRdm=1 indicate that the applying sequence is adjusted from the first applying sequence to the second applying sequence. CTRm=0 and CTRdm=0 indicate that the applying sequence remains unchanged changed and keeps the first applying sequence.

As a result, in order to output a display data having the same arrangement as the output display data DD_OUT, the input display data DD_IN is rearranged to match the output display data DD_OUT via the switch circuit 417.

Figure 5:
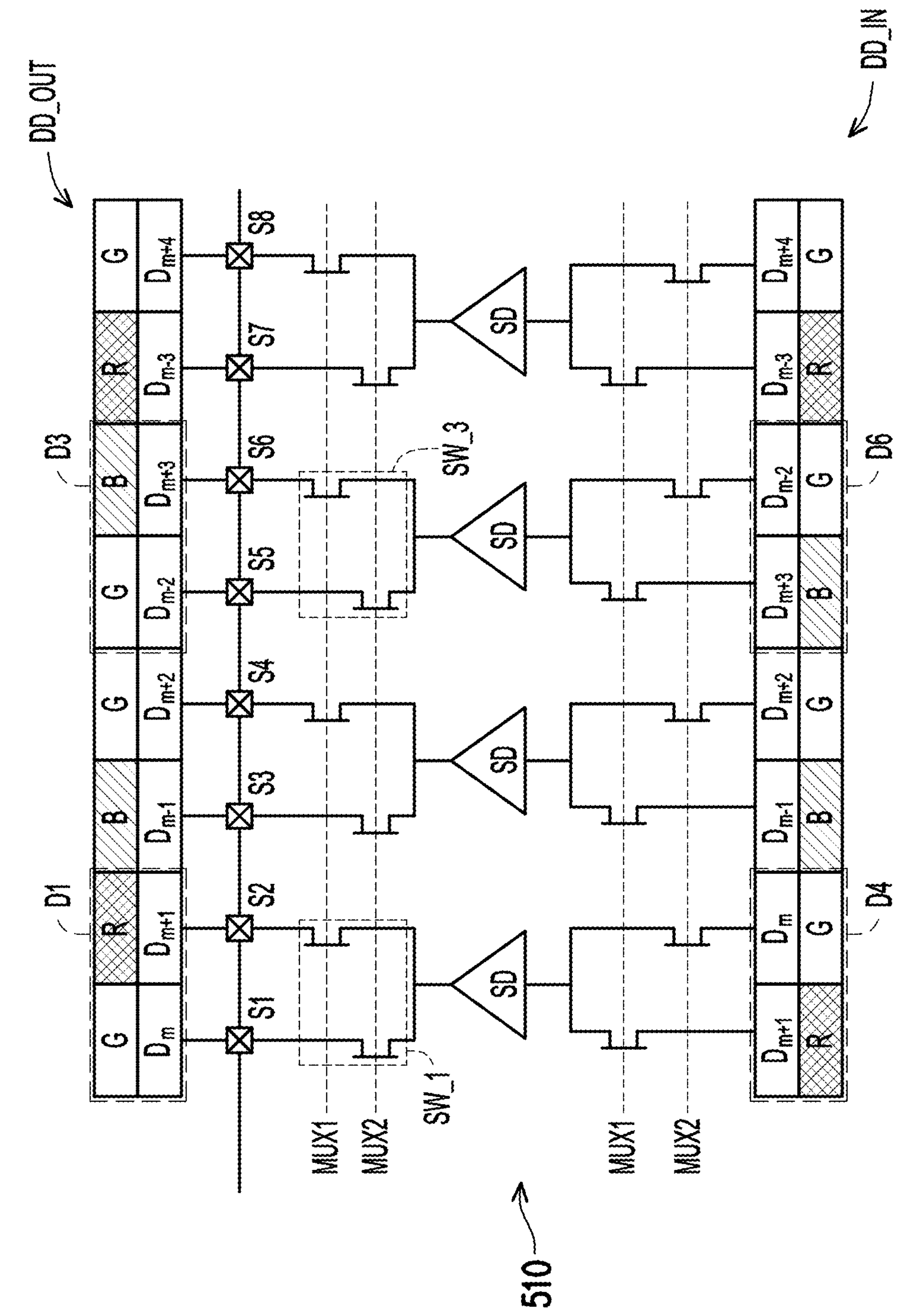
FIG. 5 is a schematic diagram illustrating an adjustment of the control signals MUX1 and MUX2 according to an embodiment of the invention.

FIG. 5 is a schematic diagram illustrating an adjustment of the control signals MUX1 and MUX2 according to an embodiment of the invention. Referring to FIG. 5, in the present embodiment, the data sets D4 and D6 of the input display data DD_IN and the data sets D1 and D3 of the output display data DD_OUT are mismatched. Therefore, the control signals MUX1 and MUX2 are adjusted and applied to the first switch sets SW_1 and SW_3. As a result, the source pads S1 and S2 can respectively output the display data $D_m$ and $D_{m+1}$, and the source pads S5 and S6 can respectively output the display data $D_{m-2}$ and $D_{m+3}$.

Figure 6A:
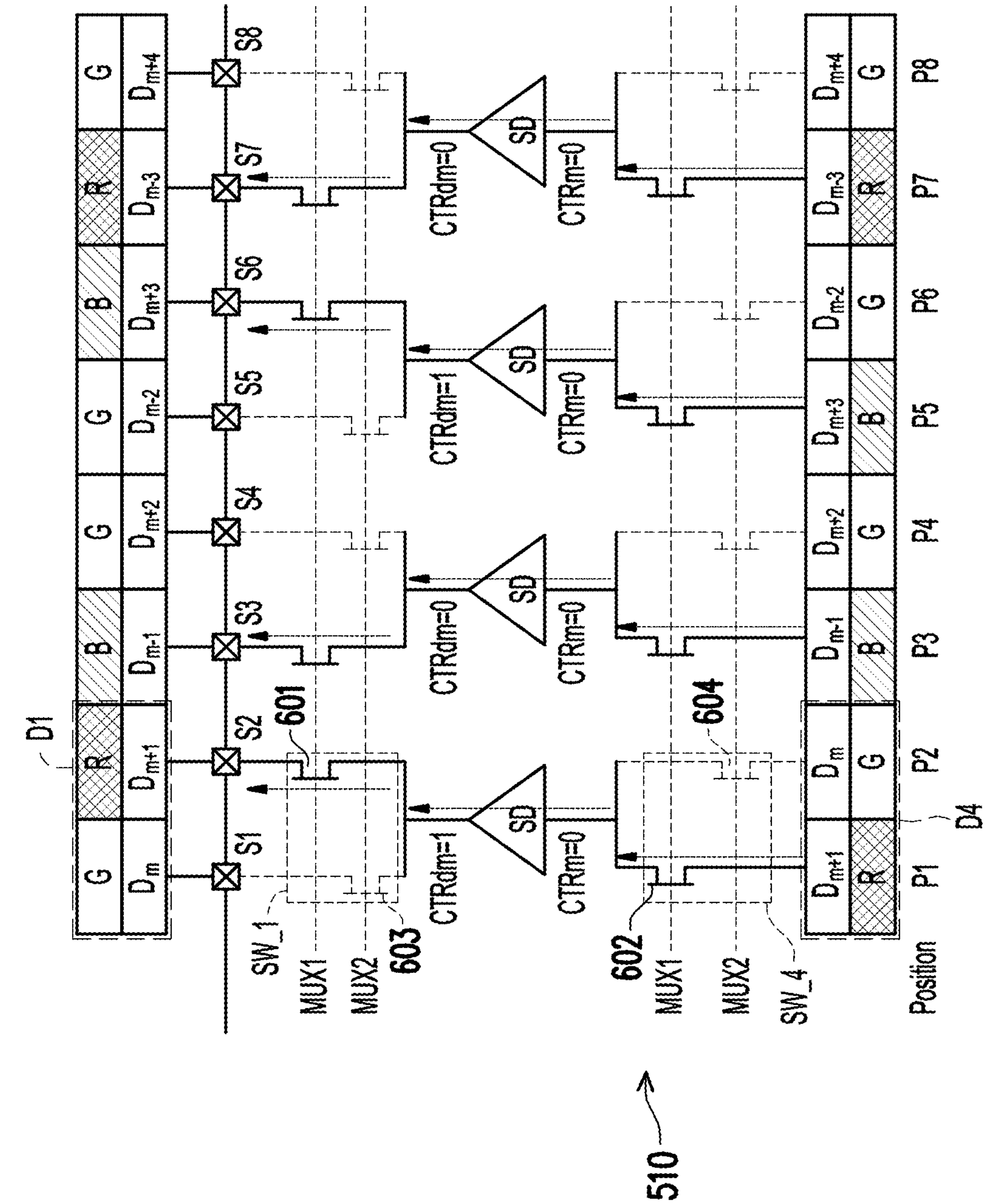
FIG. 6A illustrates a case where the control signal MUX1 turns on corresponding switches according to an embodiment of the invention.
Figure 6B:
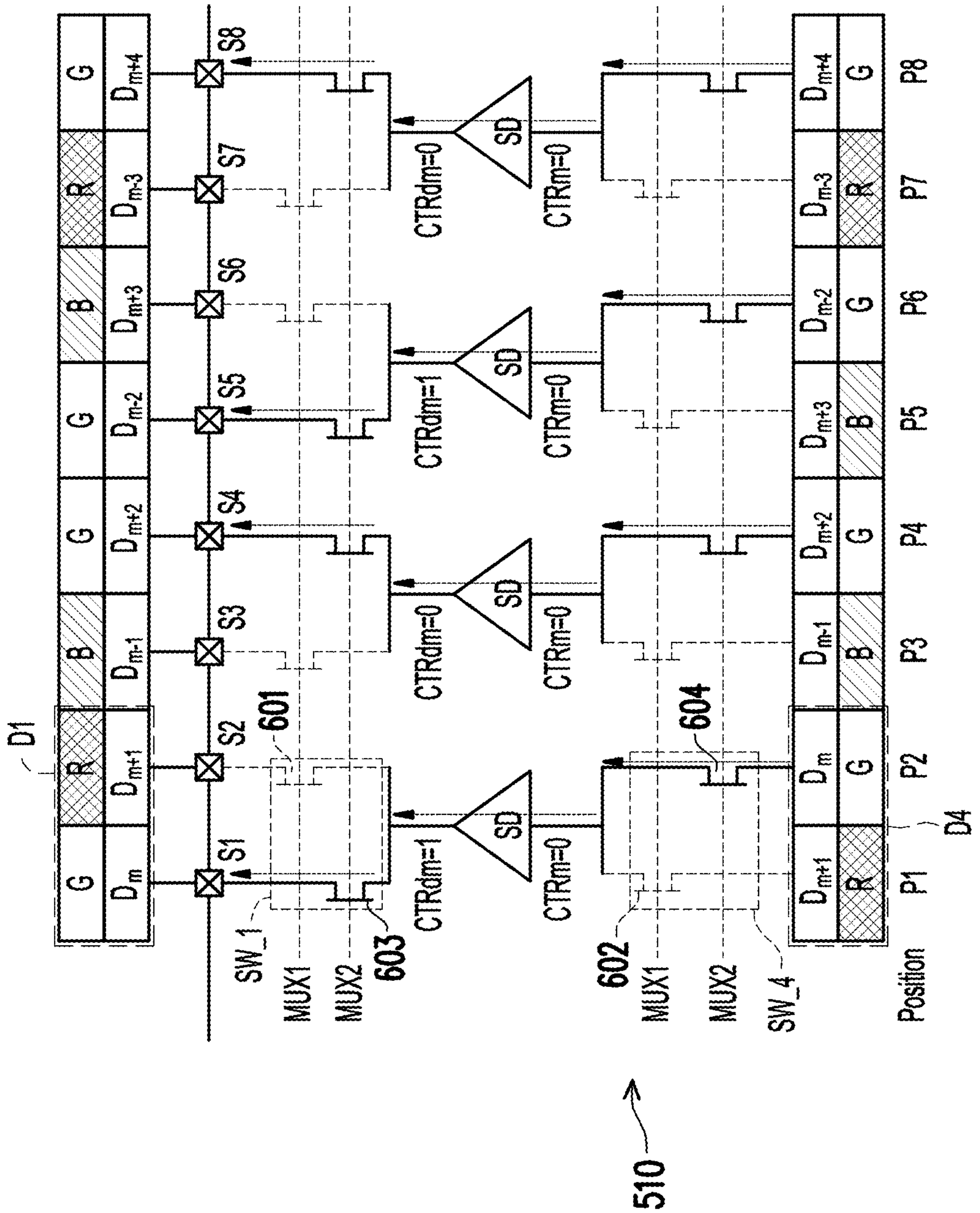
FIG. 6B illustrates a case where the control signal MUX2 turns on corresponding switches according to an embodiment of the invention.

To be specific, FIG. 6A illustrates a case where the control signal MUX1 turns on corresponding switches according to an embodiment of the invention, and FIG. 6B illustrates a case where the control signal MUX2 turns on corresponding switches according to an embodiment of the invention.

Taking the display data $D_{m-3}$ to $D_{m+4}$ of the input display data DD_IN for example, the positions P1 to P8 correspond to the source pads S1 to S8. Each two neighboring display data are grouped as a data set. Each data set has corresponding switch sets and adjustment signals CTRm and CTRdm. For example, the two neighboring display data $D_{m+1}$ and $D_m$ are grouped as the data set D4, and the data set D4 has corresponding switch sets SW_4 and SW_1. The switch set SW_4 serves as a multiplexer circuit, and the switch set SW_1 serves as a demultiplexer circuit.

The second adjustment signal CTRm indicates whether the applying sequence of the control signals MUX1 and MUX2 is adjusted. When CTRm=0 (second state), the applying sequence of the control signals MUX1 and MUX2 is not adjusted. When CTRm=1 (first state), the applying sequence of the control signals MUX1 and MUX2 is adjusted.

The first adjustment signal CTRdm indicates whether the applying sequence of the control signals MUX1 and MUX2 is adjusted. When CTRdm=0, the applying sequence of the control signals MUX1 and MUX2 is not adjusted. When CTRdm=1, the applying sequence of the control signals MUX1 and MUX2 is adjusted.

In FIG. 6A, CTRdm=1 indicates the applying sequence of the control signals MUX1 and MUX2 for the switch set SW_1 is adjusted, CTRm=0 indicates the applying sequence of the control signals MUX1 and MUX2 for the switch set SW_4 is not adjusted. When the control signal MUX1 turns on the switches 601 and 602, the control signal MUX2 turns off the switches 603 and 604. The display data $D_{m+1}$ is transmitted from the position P1 to the source pad S2, and outputted to a corresponding data line. Next, in FIG. 6B, when the control signal MUX1 turns off the switches 601 and 602, the control signal MUX2 turns on the switches 603 and 604. The display data $D_m$ is transmitted from the position P2 to the source pad S1, and outputted to a corresponding data line. The display data $D_{m+1}$ and $D_m$ of the data set D4 are outputted in a time-division manner.

The operating method of other switches can refer to that of the switches 601 to 604, and no further description will be provided herein. In an embodiment, the driver circuit 510 may include a register circuit (not shown) to set the adjustment signals CTRm and CTRdm. The adjustment of the control signals MUX1 and MUX2 is controlled by the adjustment signals CTRm and CTRdm to allow flexibility in the data arrangement of the output display data DD_OUT to meet the design requirements of the display panel.

The adjustment signals CTRm and CTRdm can be set independently for each switch set. Alternatively, the adjustment signals CTRm and CTRdm can be set repeatedly for multiple switch sets. For example, each two to eight switch sets are set to have the same adjustment signals CTRm and CTRdm.

Figure 7:
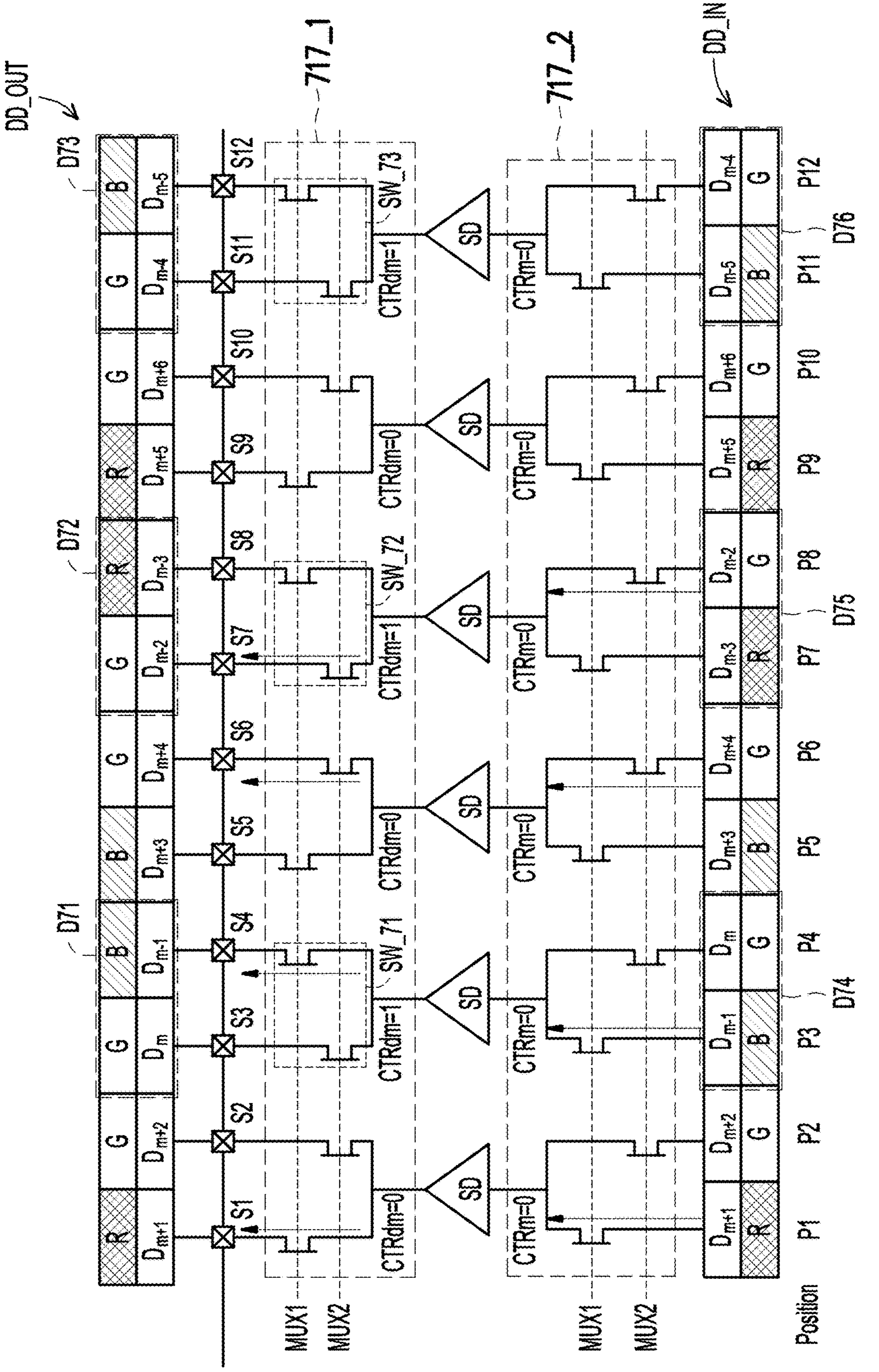
FIG. 7 is a schematic diagram illustrating an adjustment of the control signals MUX1 and MUX2 according to another embodiment of the invention.

FIG. 7 is a schematic diagram illustrating an adjustment of the control signals MUX1 and MUX2 according to another embodiment of the invention. Referring to FIG. 7, in the present embodiment, green display data is located at outputs of the switches that are controlled by the control signal MUX2. The data sets D71, D73, D74 and D76 include green display data and blue display data. The data sets D72 and D75 include green display data and red display data. The data sets D74, D75 and D76 of the input display data DD_IN and the data sets D71, D72 and D73 of the output display data DD_OUT are mismatched. The control signals MUX1 and MUX2 are adjusted and applied to the switch sets SW_71, SW_72 and SW_73. Accordingly, the source pads S3, S4, S7, S8, S11 and S12 can respectively output the display data $D_m$, $D_{m-1}$, $D_{m-2}$, $D_{m-3}$, $D_{m-4}$ and $D_{m-5}$.

For all switch sets of the second switch unit 717_2, CTRm=0. The two control signals MUX1 and MUX2 are applied to the neighboring second switch sets in the same applying sequence, e.g. the first applying sequence. For all switch sets of the first switch unit 717_1, it starts from CTRdm=0, and CTRdm=0 and CTRdm=1 are alternately changed. The two control signals MUX1 and MUX2 are applied to the neighboring first switch sets in different applying sequences, e.g. the first applying sequence and the second applying sequence. The output display data DD_OUT is outputted in a time-division manner.

Figure 8:
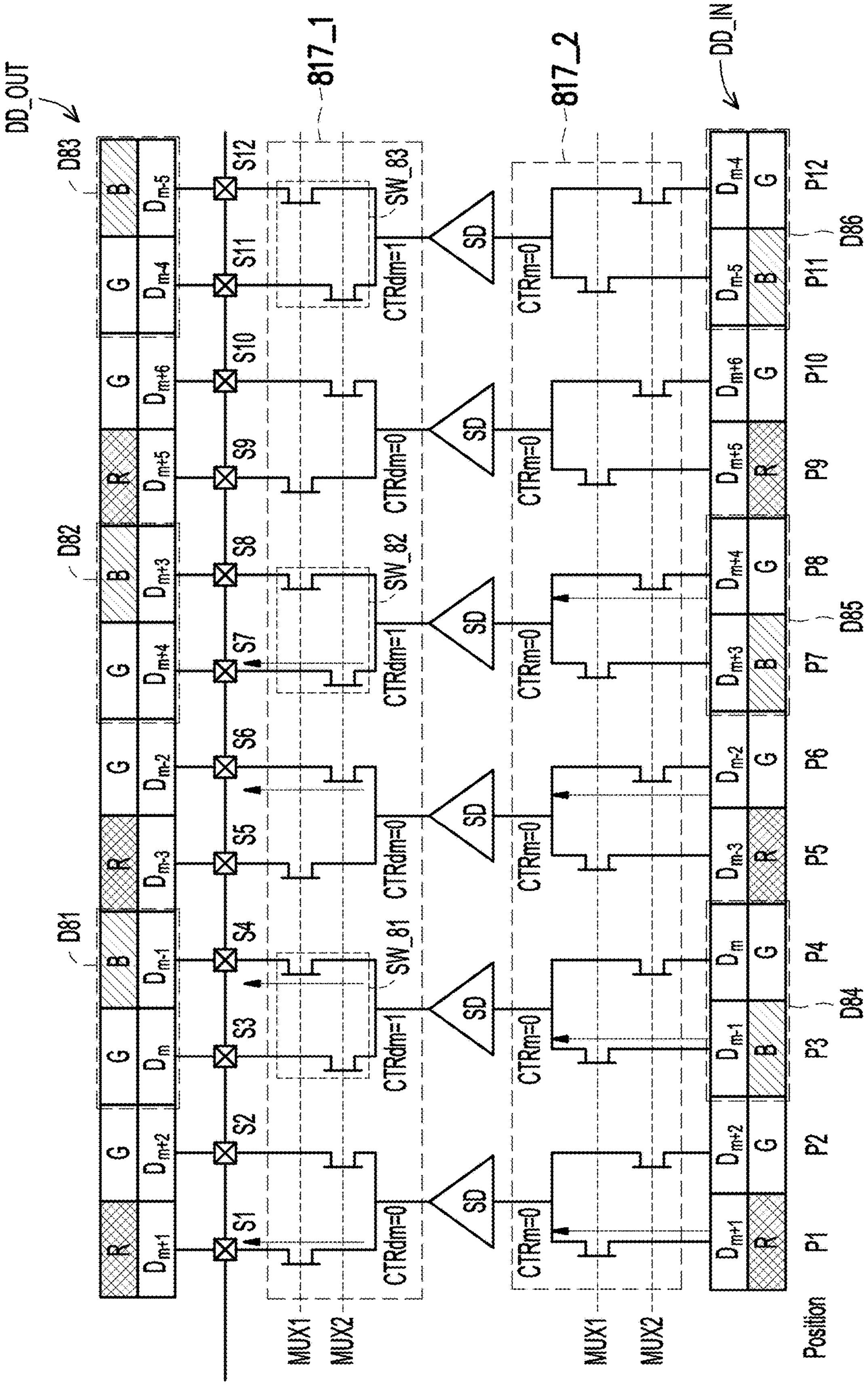
FIG. 8 is a schematic diagram illustrating an adjustment of the control signals MUX1 and MUX2 according to another embodiment of the invention.

FIG. 8 is a schematic diagram illustrating an adjustment of the control signals MUX1 and MUX2 according to another embodiment of the invention. Referring to FIG. 7 and FIG. 8, in the present embodiment, the data arrangement of FIG. 8 is different from that of FIG. 7. In FIG. 8, the data sets D84, D85 and D86 of the input display data DD_IN and the data sets D81, D82 and D83 of the output display data DD_OUT are still mismatched, and all the data sets D81 to D86 include green display data and blue display data.

The control signals MUX1 and MUX2 are adjusted and applied to the switch sets SW_81, SW_82 and SW_83, and the source pads S3, S4, S7, S8, S11 and S12 can respectively output the display data $D_m$, $D_{m-1}$, $D_{m+4}$, $D_{m+3}$, $D_{m-4}$ and $D_{m-5}$. For all switch sets of the second switch unit 817_2, CTRm=0. For all switch sets of the first switch unit 817_1, it starts from CTRdm=0, and CTRdm=0 and CTRdm=1 are alternately changed. The output display data DD_OUT is outputted in a time-division manner.

Figure 9:
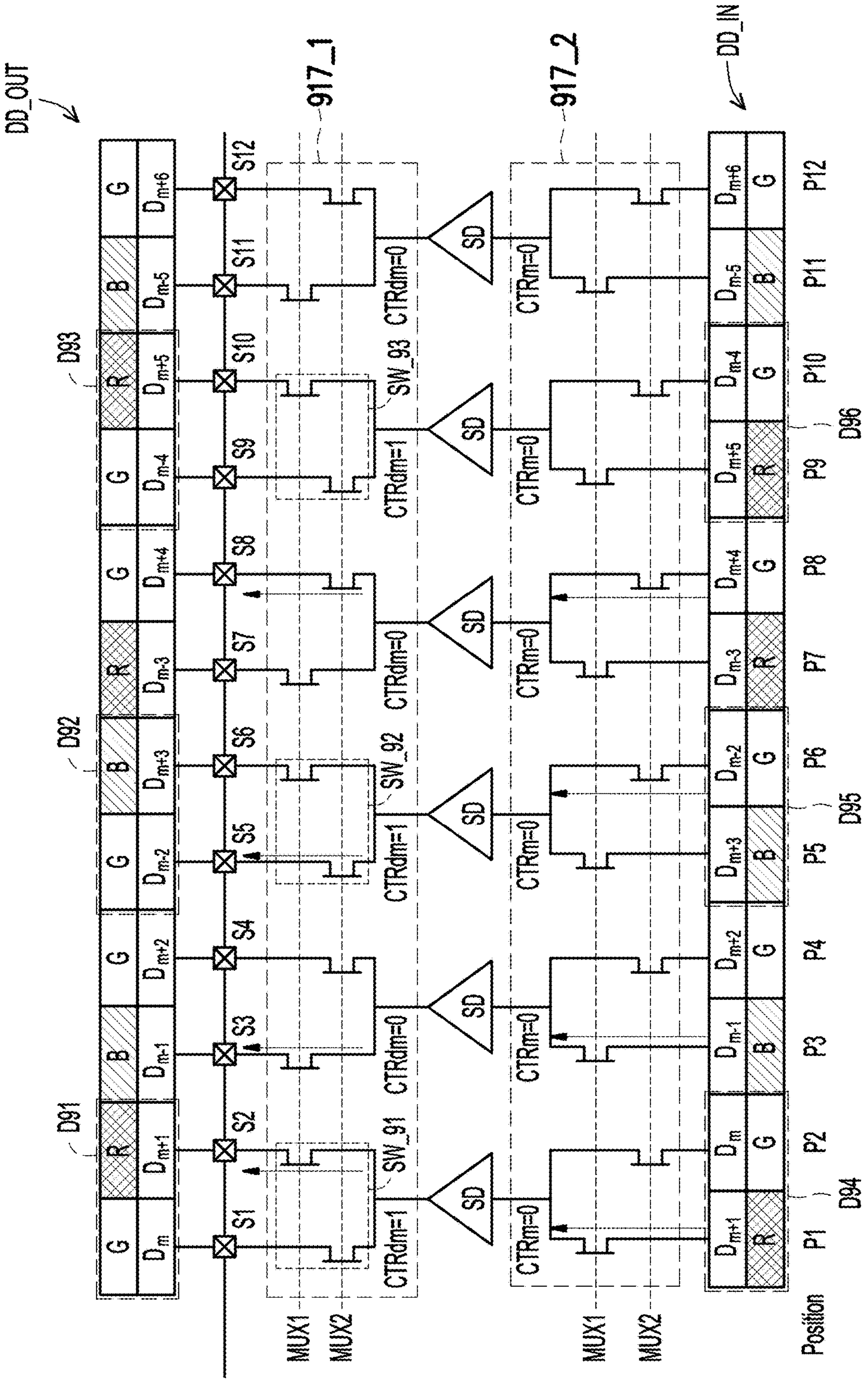
FIG. 9 is a schematic diagram illustrating an adjustment of the control signals MUX1 and MUX2 according to another embodiment of the invention.

FIG. 9 is a schematic diagram illustrating an adjustment of the control signals MUX1 and MUX2 according to another embodiment of the invention. Referring to FIG. 7 and FIG. 9, in the present embodiment, the data arrangement of FIG. 9 is also different from that of FIG. 7. In FIG. 9, the data sets D94, D95 and D96 of the input display data DD_IN and the data sets D91, D92 and D93 of the output display data DD_OUT are mismatched. The data sets D91, D93, D94 and D96 include green display data and red display data. The data sets D92 and D95 include green display data and blue display data.

The control signals MUX1 and MUX2 are adjusted and applied to the switch sets SW_91, SW_92 and SW_93, and the source pads S1, S2, S5, S6, S9 and S10 can respectively output the display data $D_m$, $D_{m+1}$, $D_{m-2}$, $D_{m+3}$, $D_{m-4}$ and $D_{m+5}$. For all switch sets of the second switch unit 917_2, CTRm=0. For all switch sets of the first switch unit 917_1, it starts from CTRdm=1, and CTRdm=1 and CTRdm=0 are alternately changed. The output display data DD_OUT is outputted in a time-division manner.

In summary, in the embodiment of the invention, the data sequence of the display data outputted from the driver circuit is rearranged to adaptively drive the display panel via the switch circuit. Two control signals are applied to control conduction states of the switch circuit, and the applying sequence of the two control signals is adjusted according to at least one adjustment signal. As a result, the input display data is rearranged to match the output display data via the switch circuit. In addition, since the switch circuit for data rearrangement are both disposed in the driver circuit, the length of the fan-out area can be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver circuit, comprising:

a switch circuit, configured to receive an input display data and output an output display data according to two control signals, wherein the input display data and the output display data have different data arrangement; and a source driver circuit, coupled to the switch circuit, and configured to output the output display data to drive a display panel via the switch circuit, wherein an applying sequence of the two control signals is adjusted according to at least one adjustment signal, and the two control signals are applied to switch sets of the switch circuit according to the applying sequence.

2. The driver circuit according to claim 1, wherein the switch circuit comprises:

a first switch unit, disposed at an output end of the source driver circuit, and configured to output the output display data according to the two control signals; and a second switch unit, disposed at an input end of the source driver circuit, and configured to receive and output the input display data according to the two control signals.

3. The driver circuit according to claim 2, wherein the first switch unit comprises a plurality of first switch sets, and each of the first switch sets is controlled by the two control signals.

4. The driver circuit according to claim 3, wherein the at least one adjustment signal comprises a first adjustment signal, and the first adjustment signal is configured to indicate whether the applying sequence of the two control signals is adjusted.

5. The driver circuit according to claim 4, wherein a first state of the first adjustment signal indicates that the applying sequence of the two control signals is adjusted; and a second state of the first adjustment signal indicates that the applying sequence of the two control signals is not adjusted.

6. The driver circuit according to claim 4, wherein the two control signals are applied to the neighboring first switch sets in different applying sequences.

7. The driver circuit according to claim 2, wherein the second switch unit comprises a plurality of second switch sets, and each of the second switch sets is controlled by the two control signals.

8. The driver circuit according to claim 7, wherein the at least one adjustment signal comprises a second adjustment signal, and the second adjustment signal is configured to indicate whether the applying sequence of the two control signals is adjusted.

9. The driver circuit according to claim 8, wherein a first state of the second adjustment signal indicates that the applying sequence of the two control signals is adjusted; and a second state of the second adjustment signal indicates that the applying sequence of the two control signals is not adjusted.

10. The driver circuit according to claim 8, wherein the two control signals are applied to the neighboring second switch sets in a same applying sequence.

* * * * *